May 29, 1934.　　　　R. FENNEMA　　　　1,961,102
LUBRICATED PLUG VALVE
Filed Jan. 22, 1932　　　2 Sheets-Sheet 2
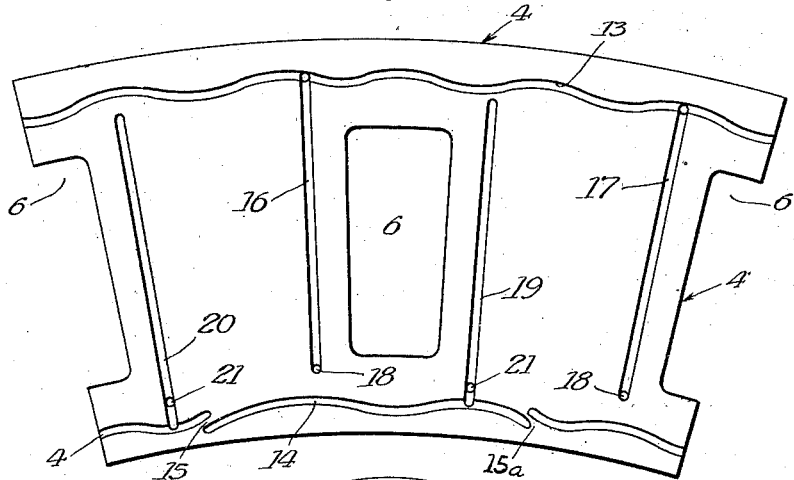
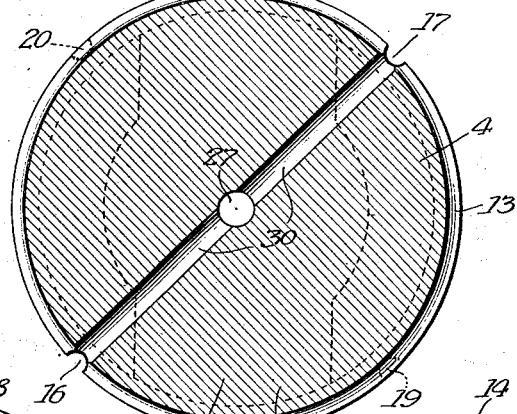
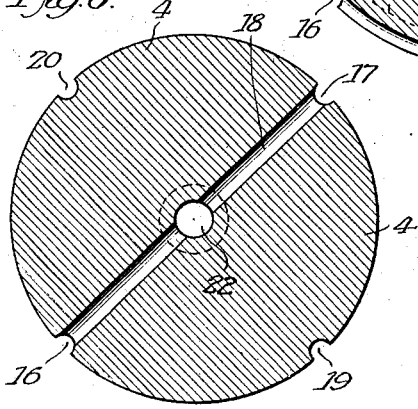
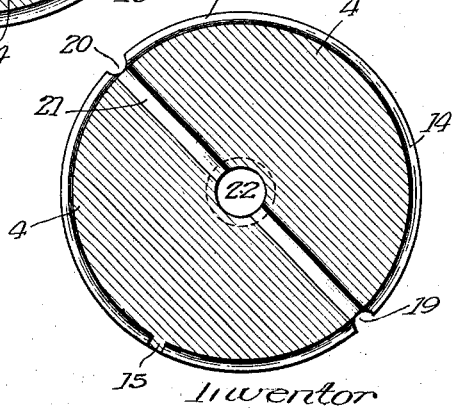
Witness.
R. B. Davison
Inventor
Richard Fennema
By Wilson, Dowell, McCanna & Belin
Att'ys.

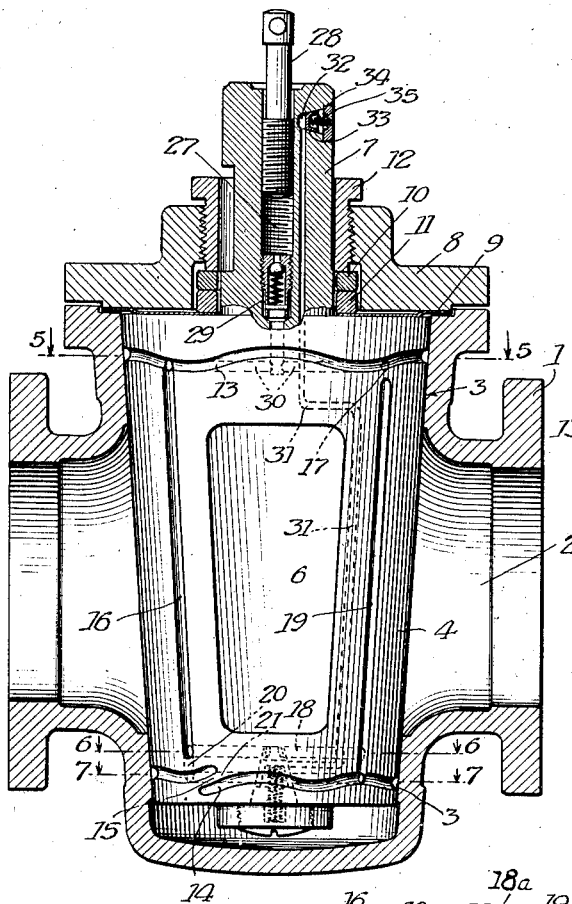

Patented May 29, 1934

1,961,102

UNITED STATES PATENT OFFICE 1,961,102

LUBRICATED PLUG VALVE

Richard Fennema, Chicago, Ill., assignor to Crane Co., Chicago, Ill., a corporation of Illinois Application January 22, 1932, Serial No. 588,112

14 Claims. (Cl. 251—93)

This invention relates to lubricated and sealed plug valves generally known as cocks.

This type of valve is preferred to gate or globe valves in many instances, particularly where cost is an important feature and in certain kinds of service where a plug valve is more suitable due to its large seating areas. Plug valves, however, must be properly lubricated to insure proper operation, i. e., to prevent sticking and also to prevent leaking. The lubrication of a plug valve presents many difficulties, the main ones of which are to provide sufficient lubrication without causing passage of lubricant into the line, and to prevent washing out of the lubricant grooves by the line fluid particularly when the lubricant grooves are exposed to the line pressure.

It is the purpose of this invention therefore to provide a means for lubricating and sealing a cock which will minimize the possible amount of lubricant passed into the interior of the cock under normal conditions and which will not permit complete wash out of the lubricant or the lubricant grooves at any time. In accordance with this invention lubricant is conducted to the seating surfaces of the plug and body in such a manner as to provide substantially a complete seal around the port through the valve body when the plug is in either open or closed position. Furthermore, the lubricant grooves are so arranged as to permit flow of lubricant therethrough at all times and yet prevent line fluids from removing lubricant from any of the lubricant grooves except those actually exposed to the line pressure. In other words, the lubricant grooves are never cut off from the supply of lubricant in such a manner as to prevent the feeding of lubricant thereto but they are blocked in such a manner that only the exposed groove at most may be washed free from lubricant by the fluid being transported through the valve.

A better understanding of this invention will be had from the following description given in connection with the drawings illustrating one embodiment of this invention, and in which Fig. 1 is a longitudinal vertical section through the center of a cock embodying this invention, the plug being shown in elevation and in closed position;

Fig. 2 is a perspective taken from above the plug;

Fig. 3 is a side elevation partially in section of the lower portion of the plug;

Fig. 4 is a development of the lubricant grooves formed in the plug seating surface;

Fig. 5 is a transverse section taken on line 5—5 of Fig. 1;

Fig. 6 is a transverse section taken on line 6—6 of Fig. 1; and

Fig. 7 is a transverse section taken on line 7—7 of Fig. 1;

Referring to the drawings, the illustrated cock comprises a body 1 having a passage 2 therethrough, the ends of the body terminating in flanges to receive suitable pipe connections. The body also has a tapered plug chamber or seat 3 arranged transversely to the passage 2. Seated within the seat 3 of the body is a correspondingly tapered plug 4 having a port 6 therethrough and terminating in an upwardly extending stem 7. The plug is held in position by a bonnet 8 which may be secured to the body by the usual studs (not shown). Clamped between the bonnet and body is a gasket 9, and within the bonnet and surrounding stem is a thrust washer 11 and a collar 10 which serve to hold the plug in seated position through the medium of a nut 12 threaded to the bonnet. The plug is adapted to be rotated within the body to open or close the passage through the body. The plug is limited to 90° rotation by interlocking engagement with the collar 10 and the plug stem in the usual manner.

In order to lubricate the cock, that is, lubricate the seating surfaces between the plug and body and also seal the same, the plug is provided with an undulating annular lubricant groove 13 around its upper end and a similar groove 14 around its lower end, the latter groove being interrupted at 15 and diametrically opposite at 15a by overlapping spaced ends so that it is not a continuous groove. The plug is also provided with two diametrically opposite vertical or longitudinal grooves 16 and 17 which connect at their upper ends to the upper groove 13 but stop short at their lower ends of the lower groove 14, and one groove lying adjacent each end of the port 6 through the plug. The two lower ends of grooves 16 and 17 are connected by a radial duct 18 extending across the bottom of the plug and passing through the center thereof. The plug is also provided with two additional diametrically opposite vertical or longitudinal grooves 19 and 20 spaced 90° from grooves 16 and 17 and whose lower ends communicate with the lower groove 14 and whose upper ends stop short of the upper groove 13. The latter two grooves lie adjacent the opposite sides of the ends of port 6 from grooves 16 and 17. The lower ends of grooves 19 and 20 are also connected by a radial port or duct 21 also passing through the center of the plug but at a plane lower than groove 18.

The lower end of the plug is provided with a conical bore 22, perpendicular to transverse passages 18 and 21, and which extends through both passages 18 and 21. Seated within the conical base but leaving an upper chamber 18a between the ends of passage 18 is a valve 23 held in seating engagement by spring 24, which in turn is held under compression by nut 26 screwed into the larger lower end of the base. The valve is of such dimensions as to close passage 21 when in seated position and thereby prevent flow through this duct and also prevents communication between passages 18 and 21. The valve does not however prevent flow through passage 18. In order to get lubricant into the series of grooves just described and to the seating surfaces of the plug and body, the stem is bored centrally to provide a lubricant compression chamber 27 into which is threaded the compressing screw or plunger 28. The chamber is provided with a removable check valve unit 29 adjacent its lower end, which end communicates with two radial ducts or ports 30 which lead to diametrically opposite points in groove 13 preferably at the upper terminating ends of grooves 16 and 17.

In order to prevent lubricant under pressure from causing binding of the plug in its tapered seat and to provide a lubricant supply indicator which will denote a condition when the complete lubricant circuit in the plug or body is filled with grease, the upper end of bore 22 is relieved by a small duct 31 leading to the upper end of bore 22 and extending outwardly through the plug terminating at its upper end in a conical lateral bore 32 formed in the exposed end of the stem. This conical bore is closed by valve 33 held in seating position by spring 34 maintained under compression by a screw plug 35 screwed into the outer end of bore 32 and having an aperture therethrough. Spring 34 is stronger than spring 24 and will not permit opening of valve 33 until after opening of valve 23 and the building up of pressure of the lubricant sufficient to open valve 33, whereupon lubricant will exude through the side of the stem thus indicating that the plug is lubricated.

It is of course, obvious that the relief duct 31 may connect at any point within the lubricant circuit, for example, at the uppermost end of the groove 19.

The rotation of the plug is restricted to 90°, as heretofore stated, and the limited arc of rotation is such that vertical grooves 16 and 17 which terminate at their upper ends in the circumferential groove 13 are never exposed to line pressure, furthermore these grooves are always in communication with lubricant under pressure and provide a closed unexposed lubricant circuit being connected by the transverse duct 18. The grooves 19 and 20 are exposed to the line pressure when the valve is rotated from open to closed position or vice versa, or when the valve is in intermediate positions. These latter grooves, which are exposed, are, however, blind at either end and do not constitute a continuous circuit nor are they connected to the other lubricant grooves except when lubricant is actually being forced into the system under pressure. Therefore, although the grooves 19 and 20 may be washed out by action of the line fluid, the line fluid cannot wash out any grooves except these two, and cannot affect in any way any other groove.

Lubrication of the valve is accomplished by turning the screw 28 downwardly to force lubricant through check valve unit 29 into duct 30 and thence grooves 13, 16 and 17 to transverse duct 18 and the chamber 18a. When sufficient pressure has been built up in the chamber 18a, thus exerting lubricant pressure on the check valve 23 sufficiently to unseat it, the flow of lubricant enters the transverse duct 21, the vertical grooves 19 and the circumferential groove 14. After the lubricant pressure upon both sides of valve 23 has become equalized spring 24 will close valve 23. If too much pressure is applied to the lubrication a portion of the lubricant will pass upwardly through duct 31, open valve 33 and flow out of the side of the valve stem. Valve 23 will of course also be opened at this time but as soon as equalization of pressure is again established it will be closed by spring 24.

It follows from the above that the lubricant system provided is such that an effective seal is formed around the ports when the plug is in either closed or open position and prevents loss of lubricant except that lubricant which is contained in the exposed grooves when the plug is rotated or left in an intermediate position. It also eliminates any possibility of line fluid passing through the lubricant system and washing cut more than the exposed grooves.

It is obvious that many minor changes may be made in the details of construction without departing from the spirit and scope of this invention as defined in the appended claims.

I claim:

1. In a lubricated and sealed cock, a body having a passage therethrough and a valve chamber transverse to said passage, a plug rotatably seated in said chamber and means for lubricating said cock comprising circumferential and diametrically opposite longitudinal lubricant grooves in the seating surfaces of the plug and body, said grooves being arranged to substantially surround the ends of said passage through the body, and means for supplying lubricant under pressure to said grooves at all positions of said plug including a valve in the lubricant supply channels for preventing circulation of line fluid from those portions of the grooves exposed to the line pressure to those unexposed.

2. In a lubricated and sealed cock, a body having a passage therethrough and a valve chamber transverse to said passage, a plug rotatably seated in said chamber and means for lubricating said cock comprising circumferential and diametrically opposite longitudinal lubricant grooves in the seating surface of the plug, said grooves being arranged to substantially surround the ends of said passage through the body, and means for supplying lubricant under pressure to said grooves at all positions of said plug including a valve in the lubricant supply channels for preventing circulation of line fluids from those portions of the grooves exposed to the line pressure to those unexposed.

3. In a lubricated and sealed cock, a body having a passage therethrough and a valve chamber transverse to said passage, a plug rotatably seated in said chamber, and means for lubricating said cock comprising a circumferential lubricant groove adjacent each end of the plug and diametrically opposite longitudinal lubricant grooves each of said longitudinal grooves extending to one of said circumferential grooves and stopping short of the other of said circumferential grooves, said circumferential and longitudinal grooves being arranged to substantially surround the ends of said passage through the body, adjacent longitudinal grooves being in communication with opposite circumferential grooves and means for supplying lubricant under pressure to said grooves.

4. In a lubricated and sealed cock, a body having a passage therethrough and a valve chamber transverse to said passage, a plug rotatably seated in said chamber, and means for lubricating said cock comprising a circumferential lubricant groove adjacent each end of the plug and communicating diametrically opposite longitudinal lubricant grooves each of said longitudinal grooves extending to one of said circumferential grooves and stopping short of the other of said circumferential grooves, said circumferential and longitudinal grooves being arranged to substantially surround the ends of said passage through the body, adjacent longitudinal grooves being in communication with opposite circumferential grooves and means for supplying lubricant under pressure to said grooves at all positions of said plug, and means for preventing circulation of line fluids from those portions of the grooves exposed to the line pressure to those unexposed.

5. In a lubricated and sealed cock, a body having a passage therethrough and a valve chamber transverse to said passage, a plug rotatably seated in said chamber, and means for lubricating said cock comprising a circumferential lubricant groove adjacent each end of the plug and diametrically opposite longitudinal lubricant grooves in the seating surfaces of the plug and body said circumferential and longitudinal grooves being arranged to substantially surround the ends of said passage through the body, radial ducts connecting pairs of said longitudinal grooves together at their corresponding ends, means for interrupting the continuity of one of said radial ducts, and means for supplying lubricant under pressure to said grooves.

6. In a lubricated and sealed cock, a body having a passage therethrough and a valve chamber transverse to said passage, a plug rotatably seated in said chamber, and means for lubricating said cock comprising a circumferential lubricant groove adjacent each end of the plug and diametrically opposite longitudinal lubricant grooves in the seating surfaces of the plug and body said circumferential and longitudinal grooves being arranged to substantially surround the ends of said passage through the body, radial ducts connecting pairs of said longitudinal grooves together at their corresponding ends, a check valve for interrupting the continuity of one of said radial ducts, and means for supplying lubricant under pressure to said grooves.

7. In a lubricated and sealed cock, a body having a passage therethrough and a valve chamber transverse to said passage, a plug rotatably seated in said chamber, and means for lubricating said cock comprising a circumferential lubricant groove adjacent each end of the plug and diametrically opposite longitudinal lubricant grooves in the seating surfaces of the plug and body said circumferential and longitudinal grooves being arranged to substantially surround the ends of said passage through the body, radial ducts connecting pairs of said longitudinal grooves together at their corresponding ends, a check valve automatically operable by the lubricant under pressure to control the continuity of one of said radial ducts, and means for supplying lubricant under pressure to said grooves.

8. In a lubricated and sealed cock a body having a passage therethrough and a valve chamber transverse to said passage, a plug rotatably seated in said chamber, and means for lubricating said cock comprising an upper circumferential groove formed around the plug, two vertical grooves diametrically opposite one another also formed in the plug said latter grooves terminating at their upper ends in said circumferential groove and being connected at their lower ends by a radial duct through said plug, a second circumferential groove formed around the lower end of said plug and a second pair of vertical grooves diametrically opposite one another terminating at their lower ends in said lower circumferential groove and also being connected by a radial duct through said plug, said two radial ducts lying in different planes and a normally closed valve in one of said radial ducts, and means for supplying lubricant under pressure to said grooves and ducts at a pressure sufficient to open said valve.

9. In a lubricated and sealed cock, a body having a passage therethrough and a valve chamber transverse to said passage, a plug rotatably seated in said chamber, and means for lubricating said cock comprising an upper circumferential groove formed around the plug, two vertical grooves diametrically opposite one another also formed in the plug, said latter grooves terminating at their upper ends in said circumferential groove and being connected at their lower ends by a radial duct through said plug, a second circumferential groove formed around the lower end of said plug and a second pair of vertical grooves diametrically opposite one another terminating at their lower ends in said lower circumferential groove and also being connected by a radial duct through said plug, said two radial ducts lying in different planes and a normally closed valve in said second radial duct, means for supplying lubricant under pressure to said grooves and ducts at a pressure being sufficient to open said valve, and means for limiting the rotation of said plug within said body to prevent said first mentioned vertical grooves from being exposed to the line pressure.

10. In a lubricated and sealed cock a body having a passage therethrough and a valve chamber transverse to said passage, a plug rotatably seated in said chamber, and means for lubricating said cock comprising an upper circumferential groove formed around the plug, two vertical grooves diametrically opposite one another also formed in the plug said latter grooves terminating at their upper ends in said circumferential groove and being connected at their lower ends by a radial duct through said plug, a second circumferential groove formed around the lower end of said plug and a second pair of vertical grooves diametrically opposite one another terminating at their lower ends in said lower circumferential groove and also being connected by a radial duct through said plug, said two radial ducts lying in different planes, a valve chamber connecting said ducts and a valve seating therein arranged to block said second radial duct, and means for supplying said grooves and ducts with lubricant at a pressure sufficient to open said valve.

11. A plug valve having a lubricating system comprising lubricant grooves for distributing lubricant between the valve plug and its seat arranged to substantially surround the seat ports when the plug is in either open or closed position, including a set of connected circumferential and longitudinal grooves which are never exposed to line pressure and another set of grooves normally unconnected with the first which are so exposed when the plug is in an intermediate position, a lubricant reservoir connected with the first mentioned set of grooves, and ducts for connecting the two sets of grooves having normally closed check valve means arranged to permit a forced feed of lubricant from grooves of the first mentioned set to those of the second mentioned set and to prevent circulation of line fluid from exposed to unexposed grooves.

12. A plug valve having a lubricating system comprising lubricant grooves for distributing lubricant between the valve plug and its seat arranged to substantially surround the seat ports when the plug is in either open or closed position, including connected circumferential and longitudinal grooves which are never exposed to line pressure and other longitudinal grooves normally unconnected with said first mentioned grooves or with each other and which are so exposed when the plug is in an intermediate position, a lubricant reservoir in communication with said connected grooves, and ducts for connecting said connected grooves with said unconnected grooves having normally closed check valve means arranged to permit a forced feed of lubricant from said connected grooves to the others and to prevent circulation of line fluid from exposed to unexposed grooves.

13. A plug valve having a lubricating system comprising lubricant grooves for distributing lubricant between the valve plug and its seat, including circumferential grooves above and below the plug port and diametrically opposite longitudinal grooves which are never exposed to line pressure and other diametrically opposite longitudinal grooves which are so exposed when the plug is in an intermediate position, said longitudinal grooves being in the surface of the plug, a lubricant reservoir in the plug, ducts connecting said reservoir with one of said circumferential grooves, said first mentioned longitudinal grooves leading from the last mentioned circumferential groove and terminating short of the other of said circumferential grooves, which other comprises two separate and distinct semi-circular grooves, said second mentioned longitudinal grooves leading respectively from said semi-circular grooves and terminating short of the circumferential groove which is connected with said reservoir, ducts in the plug for conducting lubricant from said first mentioned longitudinal grooves to said other opposite grooves, and normally closed check valve means controlling said last mentioned ducts to permit a forced feed of lubricant to the grooves which are subject to exposure to line pressure and to prevent circulation of line fluid in the unexposed grooves.

14. A plug valve having a lubricating system comprising lubricant grooves for distributing lubricant between the valve plug and its seat, including circumferential grooves above and below the plug port and diametrically opposite longitudinal grooves which are never exposed to line pressure and other diametrically opposite longitudinal grooves which are so exposed when the plug is in an intermediate position, said longitudinal grooves being in the surface of the plug, a lubricant reservoir in the plug, ducts connecting said reservoir with one of said circumferential grooves, said first mentioned longitudinal grooves leading from the last mentioned circumferential groove and terminating short of the other and said second mentioned longitudinal grooves leading from said other of said circumferential grooves and terminating short of the circumferential groove which is connected with said reservoir, a duct in the plug connecting said first mentioned longitudinal grooves, a check-valve chamber in the plug communicating at its inlet end with said last mentioned duct and having a normally seated check valve therein, and other ducts controlled by said check valve to allow a forced feed of lubricant to the grooves which are subject to exposure to line pressure and to prevent circulation of line fluid to the unexposed grooves.

RICHARD FENNEMA.